(12) United States Patent
Neichev et al.

(10) Patent No.: US 9,697,102 B2
(45) Date of Patent: Jul. 4, 2017

(54) COMPARE CONCURRENT THREADS EXECUTIONS

(71) Applicants: Nikolai Neichev, Sofia (BG); Radoslav Smilyanov, Ardino (BG); Petar Petrov, Shumen (BG)

(72) Inventors: Nikolai Neichev, Sofia (BG); Radoslav Smilyanov, Ardino (BG); Petar Petrov, Shumen (BG)

(73) Assignee: SAP SE, Walldorf (DE)

( * ) Notice: Subject to any disclaimer, the term of this patent is extended or adjusted under 35 U.S.C. 154(b) by 65 days.

(21) Appl. No.: 13/683,285

(22) Filed: Nov. 21, 2012

(65) Prior Publication Data

US 2014/0143759 A1 May 22, 2014

(51) Int. Cl.
*G06F 9/44* (2006.01)
*G06F 11/36* (2006.01)
*G06F 11/34* (2006.01)

(52) U.S. Cl.
CPC ...... *G06F 11/3632* (2013.01); *G06F 11/3466* (2013.01); *G06F 11/3612* (2013.01); *G06F 11/3636* (2013.01); *G06F 11/3644* (2013.01)

(58) Field of Classification Search
CPC ............ G06F 11/3466; G06F 11/3636; G06F 220/856; G06F 11/3644; G06F 11/3612

USPC ........................................................ 717/130
See application file for complete search history.

(56) References Cited

U.S. PATENT DOCUMENTS

| 6,560,641 | B1* | 5/2003 | Powderly | G06F 13/105 |
| | | | | 707/999.01 |
| 6,594,678 | B1* | 7/2003 | Stoutamire et al. | 707/206 |
| 7,366,873 | B1* | 4/2008 | Kohn | G06F 15/8053 |
| | | | | 712/4 |
| 8,037,477 | B2* | 10/2011 | Findeisen et al. | 718/104 |
| 8,146,057 | B1* | 3/2012 | Michelsen | 717/124 |
| 8,176,491 | B1* | 5/2012 | Plummer et al. | 718/100 |
| 2007/0250820 | A1* | 10/2007 | Edwards et al. | 717/131 |
| 2010/0235809 | A1* | 9/2010 | Rath et al. | 717/105 |
| 2011/0016357 | A1* | 1/2011 | Tsvetkov | 714/38 |
| 2012/0222016 | A1* | 8/2012 | Pastorelli | 717/127 |
| 2014/0006877 | A1* | 1/2014 | Zhu et al. | 714/45 |

* cited by examiner

*Primary Examiner* — Li B Zhen
*Assistant Examiner* — Bradford Wheaton
(74) *Attorney, Agent, or Firm* — Schwegman Lundberg & Woesner, P.A.

(57) ABSTRACT

A method for comparing concurrent thread executions is disclosed. A thread flow marker class is defined for a source code. One or more markers of the thread flow marker class are embedded in a class of interest or in places of interest within the class of interest in the source code. A flow of data from concurrent threads executions from the source code is tracked using the one or more markers.

12 Claims, 4 Drawing Sheets

COMPARE CONCURRENT THREADS EXECUTIONS

TECHNICAL FIELD

The present application relates generally to the field of a compiler, and, in one specific example, to comparing concurrent threads executions.

BACKGROUND

A compiler traditionally compiles a programming language and transforms it into an executable code. The compiler performs syntactic, semantic analysis and code generation on the programming language. The compiler can be implemented in the front end of a computer system or on the back end of a computer system as well, and forms a complex system to check the grammar definition of the programming language.

A web server typically uses hundreds of threads to process a large number of concurrent users. A thread can be processed with other threads at the same time. In order to ensure compatibility when multiple threads are trying to use shared resources, one thread is allowed to access the shared resources at a time by using thread synchronization. Thread synchronization on Java can be performed by using a monitor where every Java object has a single monitor and a monitor can be owned by only one thread. For a thread to own a monitor that is owned by a different thread, it needs to wait in the wait queue until the other thread releases its monitor.

Thus, deadlock may occur when two or more threads are waiting for other threads to complete their tasks in order to complete their own tasks. When deadlocks and memory leaks occur, there may be some useful information from performing a thread. For example, a thread dump generates information on the status of each thread such as whether a thread is new, blocked, waiting, or terminated. From this information, a list of concurrently running processes along with their corresponding status (e.g., running, sleeping, waiting) at the time of measurement can be generated in a visual graphical user interface. However, what is not visible is the time sequence of the execution of the threads that are deadlocked because the current thread dump only identifies a thread status at a time of measurement.

BRIEF DESCRIPTION OF THE DRAWINGS

Some embodiments are illustrated by way of example and not limitation in the figures of the accompanying drawings in which.

DETAILED DESCRIPTION

Figure 1:
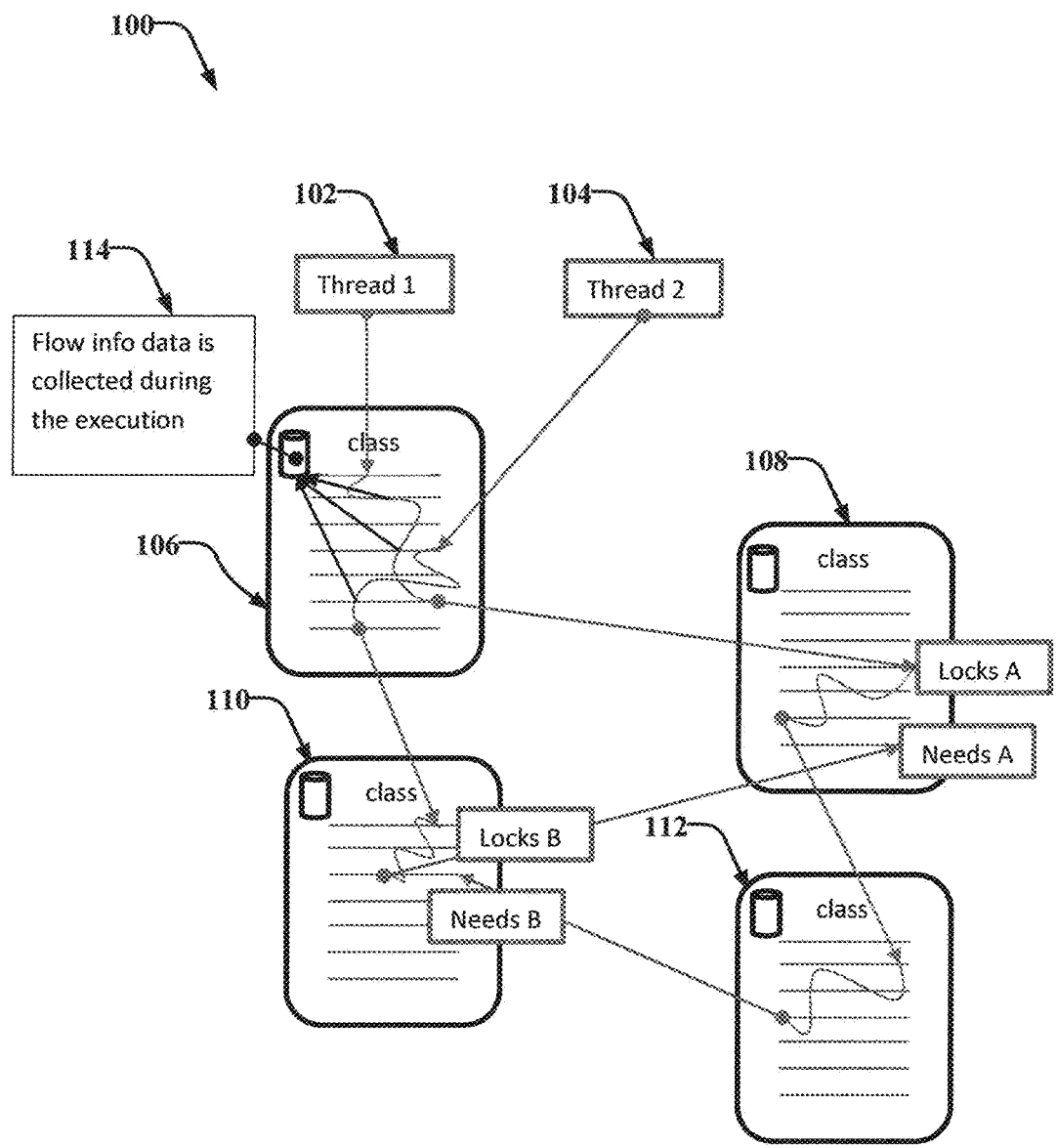
FIG. 1 is a block diagram depicting an example of tracking a flow of execution of concurrent threads.

In the following description, for purposes of explanation, numerous specific details are set forth in order to provide an understanding of various embodiments of the inventive subject matter. It will be evident, however, to those skilled in the art, that embodiments may be practiced without these specific details. Further, to avoid obscuring the inventive subject matter with unnecessary detail, well-known instruction instances, protocols, structures, and techniques have not been shown in detail. As used herein, the term "or" may be construed in an inclusive or exclusive sense. The term "user" may be construed to include a person or a machine. The term "interface" may be construed to include an application program interface (API) or a user interface. The term "database" may be construed to include a database or a NoSQL or non-relational data store (e.g., Google's BigTable or Amazon's Dynamo). The term "business object" may mean an object that represents an entity of a business inside a software application. For example, a business object may represent a person (e.g., an employee of a company) or a concept (e.g., a process within a company) inside an enterprise information management software application.

A Java heap dump is a dump of the state of the Java heap memory. Thus, the output of the heap dump is useful for analyzing what use of memory an application is making at some point in time. The heap dump is used in diagnosing memory issues and memory leaks. By adding markers in classes of interest, on places of interest within a class, it is possible to use those markers to detect a data flow of how a deadlock (or memory leak) occurred, using the standard Java heap dump. In particular, the flow data is kept in a vector in the class of interest and is visible when the predefined points of interests are executed, thus showing the order of execution.

A thread dump is a dump of the stacks of all live threads. Thus, the output of the thread dump is useful for analyzing what an application is up to at some point in time, and diagnosing thread deadlocks. The heap dump together with the thread dump allows for a clear picture of all thread flow. As such, visualization of the order of execution of the thread flow may be helpful if a memory leak occurs because it shows or displays information about the usage of the leaking objects. Visualization of the order of execution of the thread flow can easily identify the reasons of what is causing a memory leak thereby saving time. Thus, investigation of a memory leak or a deadlock issue is faster and more efficient, leading to quicker fixes for customers.

In one embodiment, a thread flow marker class is defined for source code. One or more markers of the thread flow marker class are embedded in a class of interest or in places of interest within the class of interest in the source code. Flow of data from concurrent threads executions from the source code are tracked using the one or more embedded markers. The markers are activated when the class of interest or places of interest within the class of interest are executed.

As previously discussed, a heap dump is a snapshot of the memory of a Java process. The snapshot contains information about the Java objects and classes in the heap at the moment the snapshot is triggered. Because there are different formats for persisting this data, there may be some differences in the information provided. Typically, a full garbage collection is triggered before the heap dump is written, so the heap dump contains information about the remaining objects in the heap. A thread dump lists all of the Java threads that are currently active in a Java Virtual Machine (JVM).

The thread dump and heap dump are performed on the executed source code. The markers visible from the thread dump and heap dump are used to determine an order of execution of the concurrent threads.

FIG. 1 is a block diagram depicting an example of tracking a flow of execution of concurrent threads. A source code 100 may define several classes of objects 106, 108, 110, and 112. Upon execution of the source code 100, multiple streams of execution take place concurrently within the source code 100. For example, threads or processes 102 and 104 are concurrently executed. Threads 102 and 104 may stream concurrently through object classes 106, 108, 110, and 112.

Thread 102 streams through object class 108 and locks the resources of object class 108 while requesting resources from object class 110. Thread 104 streams through object class 110 and locks the resources of object class 110 while requesting resources from object class 108. Because both threads 102 and 104 are waiting for the locked resources, a deadlock occurs. Deadlocks can also occur in Java when multiple threads need the same resources that are locked. Threads 102 and 104 could each be waiting for the other to release a lock; in such a case, they will end up waiting indefinitely.

A thread flow marker is introduced in the source code 100 to collect flow data information during execution. The thread dump may show the deadlock stack. For example, the thread dump may identify threads that are deadlocked. In other words, two or more threads are waiting for other threads to complete their tasks in order to complete their own tasks.

In one embodiment, markers are activated when the class of interest or places of interest within the class of interest is executed. A heap dump may be performed to dump out the contents of the Java Virtual Machine's memory into a file to be later analyzed. The order of execution of the concurrent threads is visible from the markers. In other words, the heap dump shows the thread flow markers.

The order of execution may be used to identify a time sequence of the execution of concurrent threads that are deadlocked. Objects causing the concurrent threads deadlocks are identified using the time sequence. The order of execution is used to identify a time sequence of the execution of objects that are causing a memory leak. Objects causing the memory leak are identified using the time sequence. The analysis of the deadlock may be performed from the results of the heap and thread dumps.

In another embodiment, a first marker from the thread flow class is added to a first thread from the source code 100. A second marker from the thread flow class is added to a second thread from the source code 100. A deadlock between the first thread and the second thread is identified using the first marker and the second marker.

In another embodiment, a Java vector is defined for the thread flow marker class. The Java vector class implements a growable array of objects from the thread flow marker class. Like an array, the Java vector contains components that can be accessed using an integer index. However, the size of a Vector can grow or shrink as needed to accommodate adding and removing items after the Vector has been created. As such, elements from the thread flow marker class are added to the array of objects to form the Java vector. An identifier associated with execution at a particular location in the source code 100 is marked into the Java vector. For example, a particular location in the source code may be marked and identified with an integer (e.g., "4"). Once that particular location has been executed, the integer "4" is marked into the Java vector. Thus, the identifier can be used to identify at least one thread causing a deadlock.

Example Source Code with Flow Info Class

The following is an example of a source code 100 which displays the usage of flow info class:

```java
import java.util.Vector;
import java.util.concurrent.TimeUnit;
import java.util.concurrent.locks.Lock;
import java.util.concurrent.locks.ReentrantLock;
public class FlowInfoUsageTest {
    // flowInfo vector will be used track the lifecycle of FlowInfoUsageTest
    // instance objects
    private Vector<Byte> flowInfo = new Vector<Byte>(10);
    private final String logoutMonitor = "logoutMonitor" +
this.hashCode( );
    private boolean logout;
    private HashSet<String> set = new HashSet<String>( );
    private Lock lock = new ReentrantLock( );
    public FlowInfoUsageTest( ) {
        for (int i = 0; i < 100; i++) {
            set.add(new Integer(i).toString( ));
            System.out.print(i + " ");
        }
    }
    public void logout( ) {
        // mark that execution of the code have passed through this code as adding "1" into flowInfo vector
        addFlowInfo(1);
        synchronized (logoutMonitor) {
            logout = true;
            // mark that execution of the code have passed through this code as adding "2" into flowInfo vector
            addFlowInfo(2);
        }
        doSomeWork(3000);
        lock.lock( );
        // mark that execution of the code have passed through this code as adding "3" into flowInfo vector
        addFlowInfo(3);
        synchronized (set) {
            for (int i = 0; i < 100; i++) {
                this.removeFromSet(new Integer(i).toString( ));
            }
        }
        lock.unlock( );
    }
    public void doSomeWork(long time) {
        if (time == 0) {
            return;
        }
        try {
            Thread.sleep(time);
        } catch (InterruptedException e) {
            e.printStackTrace( );
        }
    }
    public void removeFromSet(String s) {
        doSomeWork(1000);
        synchronized (logoutMonitor) {
            // mark that execution of the code have passed through this code as adding "4" into flowInfo vector
            addFlowInfo(4);
            doSomeWork(3000);
            // mark that execution of the code have passed through this code as adding "5" into flowInfo vector
            addFlowInfo(5);
            if (logout) {
                // mark that execution of the code have passed through this code as adding "6" into flowInfo vector
                addFlowInfo(6);
                return;
            }
            synchronized (set) {
                // mark that execution of the code have passed through this code as adding "7" into flowInfo vector
                addFlowInfo(7);
                set.remove(s);
            }
            if(set.size( ) == 0) {
                // mark that execution of the code have passed through this code as adding "8" into flowInfo vector
```

-continued

```
        addFlowInfo(8);
        logout( );
      }
    }
  }
  public void setNotLoggedOut( ) {
    try {
      if (lock.tryLock(1, TimeUnit.SECONDS)) {
        logout = false;
        // mark that execution of the code have passed through
this code as adding "9" into flowInfo vector
        addFlowInfo(9);
        lock.unlock( );
      }
    } catch (InterruptedException e) {
      e.printStackTrace( );
    }
  }
  public void addFlowInfo(int i) {
    if (flowInfo.size( ) > 100) {
      flowInfo.clear( );
    }
    if (flow.Info.isEmpty( ) || flowInfo.lastElement( ) != i) {
      flowInfo.add((byte) i);
    }
  }
  /**
   * @param args
   */
  public static void main(String[ ] args) {
    final FlowInfoUsageTest test = new FlowInfoUsageTest( );
    // create thread1
    Thread thread1 = new Thread( ) {
      public void run( ) {
        test.logout( );
      }
    };
    // create thread2
    Thread thread2 = new Thread( ) {
      public void run( ) {
        test.removeFromSet("3");
      }
    };
    // create thread3
    Thread thread3 = new Thread( ) {
      public void run( ) {
        test.setNotLoggedOut( );
      }
    };
    // start the execution of threads
    thread1.start( );
    thread2.start( );
    thread3.start( );
    test.doSomeWork(5000);
    // print the flowInfo byte array which will show the "lifecycle" of
"test" instance object
    System.out.println("\n" + test.flowInfo);
  }
}
```

The execution of the above example source code results in the program "hanging", e.g. deadlocked. In such case, a thread dump is executed to identify the stack of all live threads. The following is an example provided by the thread dump:

Found one Java-level deadlock:

```
=============================
"Thread-1":
    waiting to lock monitor 0x0000000006d99968 (object
0x00000007aae354e0, a java.util.HashSet),
    which is held by "Thread-0"
"Thread-0":
    waiting to lock monitor 0x0000000006d99a10 (object
0x00000007aae35320, a java.lang.String),
    which is held by "Thread-1"
```

Java stack information for the threads listed above:

```
======================================================
"Thread-1":
    at flowinfo.FlowInfoUsageTest.removeFromSet
    (FlowInfoUsageTest.java:66)
    - waiting to lock <0x00000007aae354e0> (a java.util.HashSet)
    - locked <0x00000007aae35320> (a java.lang.String)
    at flowinfo.FlowInfoUsageTest$2.run(FlowInfoUsageTest.java:106)
"Thread-0":
    at flowinfo.FlowInfoUsageTest.removeFromSet
    (FlowInfoUsageTest.java:58)
    - waiting to lock <0x00000007aae35320> (a java.lang.String)
    at flowinfo.FlowInfoUsageTest.logout(FlowInfoUsageTest.java:38)
    - locked <0x00000007aae354e0> (a java.util.HashSet)
    at flowinfo.FlowInfoUsageTest$1.run(FlowInfoUsageTest.java:98)
Found 1 deadlock.
Heap
   PSYoungGen   total 76288K, used 5232K [0x00000007aae00000,
0x00000007b0320000, 0x0000000800000000)
   eden space 65408K, 8% used
[0x00000007aae00000,0x00000007ab31c340,0x00000007aede0000)
   from space 10880K, 0% used
[0x00000007af880000,0x00000007af880000,0x00000007b0320000)
   to   space 10880K, 0% used
[0x00000007aede0000,0x00000007aede0000,0x00000007af880000)
  PSOldGen    total 174336K, used 0K [0x0000000700a00000,
0x000000070b440000, 0x00000007aae00000)
   object space 174336K, 0% used
[0x0000000700a00000,0x0000000700a00000,0x000000070b440000)
  PSPermGen    total 21248K, used 2578K [0x00000006fb800000,
0x00000006fccc0000, 0x0000000700a00000)
   object space 21248K, 12% used
[0x00000006fb800000,0x00000006fba84808,0x00000006fccc0000)
```

By analyzing the stack trace of the deadlocked threads, one will notice that this deadlock is not supposed to happen because locks are being obtained in the correct order.

Now, looking at the flowInfo vector values, one will see the following values: [1, 2, 9, 4, 3, 5]. These values show that a third thread had executed the "setNotLoggedOut( )" method and this thread had changed the value of the loggedOut variable to false. The same thread finished its execution successfully and caused the other two threads to deadlock.

The above example illustrates how it is easy to find that the execution of the third thread did something "wrong", causing the other two threads to deadlock. When the flow info concept is used in more complex code, the benefit of its usage is tremendous and can easily help debug such issues.

A memory leak occurs when a computer program consumes memory but is unable to release it back to the operating system. In object-oriented programming, a memory leak happens when an object is stored in memory but cannot be accessed by the running code. A memory leak has symptoms similar to a number of other problems (see below) and generally can only be diagnosed by a programmer with access to the program source code 100; however, many people refer to any unwanted increase in memory usage as a memory leak, though this is not strictly accurate from a technical perspective.

Again, it is much easier to investigate a memory leak if the flow info concept is used. One can keep track of the lifecycle of the objects and it is easy to identify why the memory of virtual machine is not being freed successfully. When analyzing the memory leak, one can check the flowInfo vector and find out what exactly happened with the lifecycle of the object.

Figure 2:
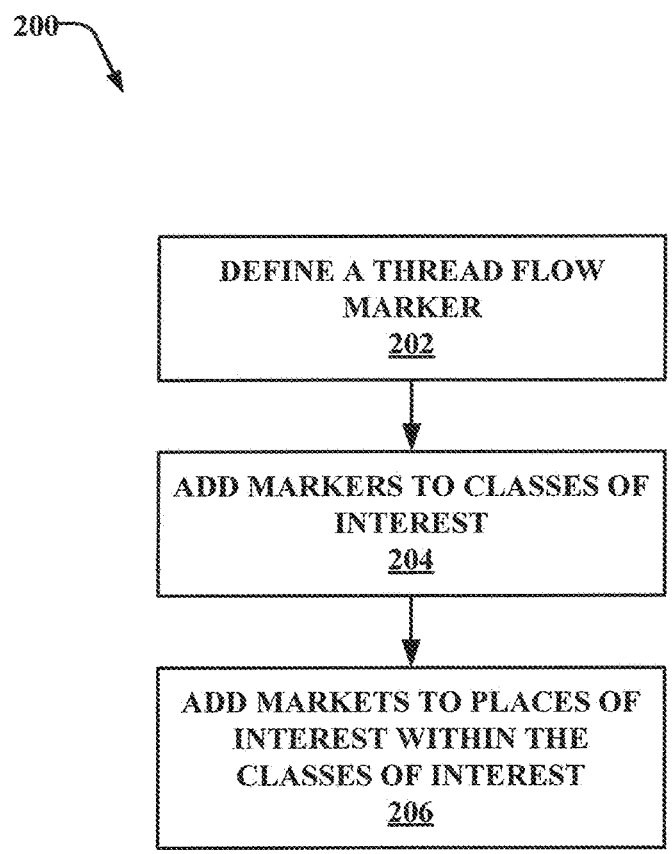
FIG. 2 is a flowchart depicting an example embodiment of a method for defining a thread flow marker.

FIG. 2 is a flowchart 200 depicting an example embodiment of a method for defining a thread flow marker. At operation 202, a thread flow marker class is defined for a source code 100. At operation 204, one or more markers of the thread flow marker class are embedded in a class of interest, or, at operation 206, in places of interest within the class of interest in the source code 100.

Figure 3:
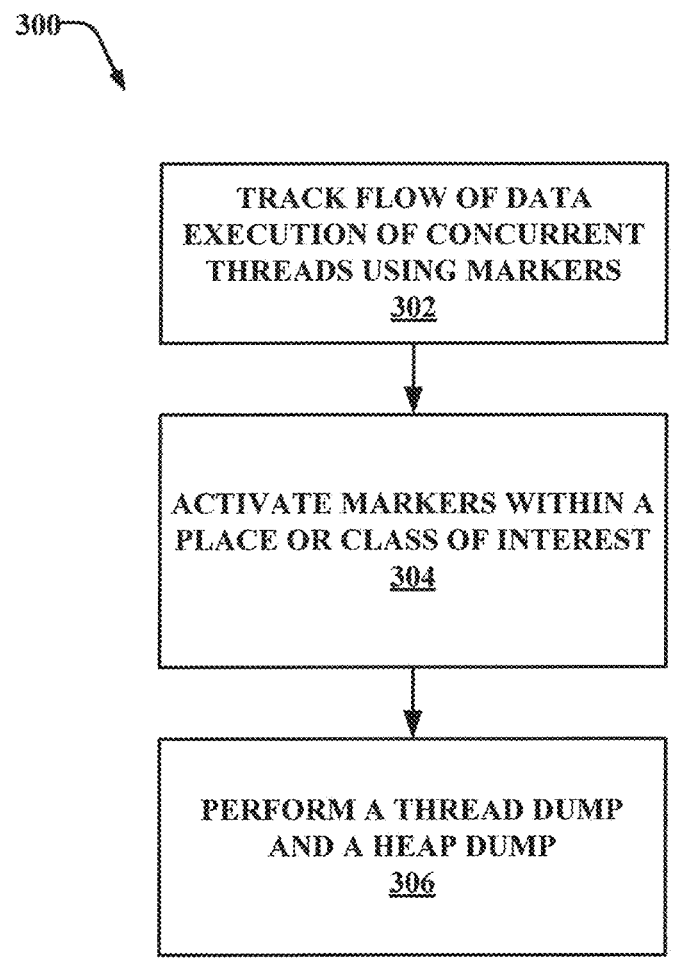
FIG. 3 is a flowchart depicting an example embodiment of a method for tracking flow data order of concurrent threads executions using a thread flow marker.

FIG. 3 is a flowchart 300 depicting an example embodiment of a method for tracking flow data order of concurrent threads executions using a thread flow marker. At operation 302, the flow of data from concurrent threads executions from the source code 100 are tracked using the one or more markers. At operation 304, markers are activated when the class of interest or places of interest within the class of interest are executed. At operation 306, thread and heap dumps of the executed source code 100 are performed. The markers visible from the thread dump and heap dumps are used to determine an order of execution of the concurrent threads.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier: e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 4:
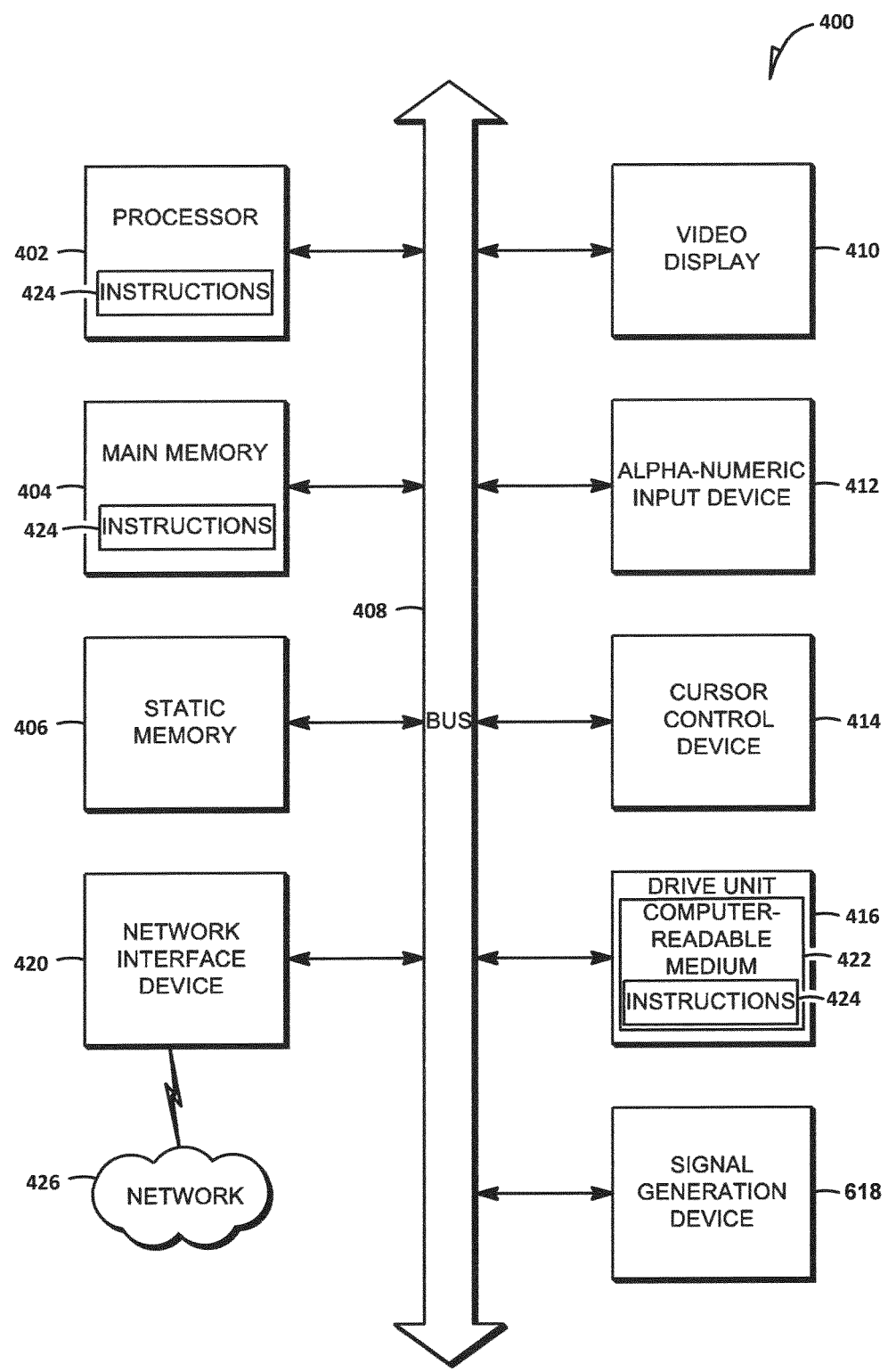
FIG. 4 is a block diagram of an example embodiment of a computer system on which methodologies described herein may be executed.

FIG. 4 is a block diagram of machine in the example form of a computer system 400 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a PC, a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU), or both), a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a user interface (UI) navigation (or cursor control) device 414 (e.g., a mouse), a disk drive unit 416, a signal generation device 418 (e.g., a speaker) and a network interface device 420.

Machine-Readable Medium

The disk drive unit 416 includes a machine-readable medium 422 on which is stored one or more sets of instructions and data structures (e.g., software) 424 embodying or utilized by any one or more of the methodologies or functions described herein. The instructions 424 may also reside, completely or at least partially, within the main memory 404 and/or within the processor 402 during execution thereof by the computer system 400, with the main memory 404 and the processor 402 also constituting machine-readable media. The instructions 424 may also reside, completely or at least partially, within the static memory 406.

While the machine-readable medium 422 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding, or carrying instructions for execution by the machine and that cause the machine to perform any one or more of the methodologies of the present embodiments, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, by way of example, semiconductor memory devices (e.g., erasable programmable read-only memory (EPROM), electrically erasable programmable read-only memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 424 may further be transmitted or received over a communications network 426 using a transmission medium. The instructions 424 may be transmitted using the network interface device 420 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:
    defining a thread flow marker class for a source code, the thread flow marker class configured to identify markers for classes of objects in the source code and determine an order of thread execution from the classes of objects using the markers;
    embedding a plurality of markers of the thread flow marker class in a class of interest or in places of interest within the class of the source code, wherein a first marker of the plurality of markers is embedded at a first position in the source code and a second marker of the plurality of markers is embedded at a second position in the source code;
    defining a vector for the thread flow marker class;
    determining that a first thread has executed a first portion of the source code corresponding to the first position;
    writing to the vector a first integer value corresponding to the first marker;
    determining that a second thread has executed a second portion of the source code corresponding to the second position;
    writing to the vector a second integer value corresponding to the second marker;
    performing a thread dump and a heap dump of the executed source code;
    identifying a sequence of integer values from the vector in response to the thread dump and heap dump, wherein the sequence of integer values comprises the first integer value and the second integer value; and
    determining an order of execution of a plurality of concurrent threads from the executed source code based at least in part on the sequence of integer values from the vector, wherein the plurality of concurrent threads comprises at least the first thread and the second thread; and
    tracking, using a hardware processor of a machine, a flow of data from the plurality of concurrent threads based at least in part on the order of execution of the plurality of concurrent threads.

2. The computer-implemented method of claim 1, further comprising:
    using the sequence of integer values from the vector to identify a time sequence of execution of the first thread and the second thread, wherein the first thread and the second thread are deadlocked; and
    identifying objects causing deadlock of the first thread and the second thread using the time sequence.

3. The computer-implemented method of claim 1, further comprising:
    using the sequence of integer values from the vector to identify a time sequence of the execution of objects that are causing a memory leak; and
    identifying objects causing the memory leak using the time sequence.

4. The computer-implemented method of claim 1, further comprising:
    using the sequence of integer values from the vector to identity at least one thread causing a deadlock.

5. A system comprising:
    a compiler, implemented in a hardware processor of a machine, configured to receive a source code with a thread flow marker class, the thread flow marker class configured to identify markers for classes of objects in the source code and determine an order of thread execution from the classes of objects using the markers;
    a marking module configured to embed a plurality of markers of the thread flow marker class in a class of interest or in places of interest within the class of interest in the source code, and to define a vector for the thread flow marker class, wherein a first marker of the plurality of markers is embedded at a first position in the source code and a second marker of the plurality of markers is embedded at a second position in the source code;
    a thread and heap dump module configured to:
        determine that a first thread has executed a first portion of the source code corresponding to the first position;
        write to the vector a first integer value corresponding to the first marker;
        determine that a second thread has executed a second portion of the source code corresponding to the second position;
        write to the vector a second integer value corresponding to the second marker; and
        perform a thread dump and a heap dump of the executed source code; and
    a tracking module configured to:
        identify a sequence of integer values from the vector in response to the thread dump and heap dump, wherein the sequence of integer values comprises the first integer value and the second integer value;
        determine an order of execution of a plurality of concurrent threads from the executed source code based at least in part on the sequence of integer values from the vector, wherein the plurality of concurrent threads comprises at least the first thread and the second thread; and
        track a flow of data from the plurality of concurrent threads based at least in part on the order of execution of the plurality of concurrent threads.

6. The system of claim 5, wherein the thread and heap dump module is further configured to use the sequence of integer values from the vector to identify a time sequence of execution of the first thread and the second thread, wherein the first thread and the second thread are deadlocked, and to identify objects causing deadlock of the first thread and the second thread.

7. The system of claim 5, wherein the thread and heap dump module is further configured to:
    use the sequence of integer values from the vector to identify a time sequence of the execution of objects that are causing a memory leak; and
    identify objects causing the memory leak using the time sequence.

8. The system of claim 5, wherein the marking module is configured to use the sequence of integer values from the vector to identify at least one thread causing a deadlock.

9. A non-transitory machine readable medium embodying a set of instructions that, when executed by one or more processors, causes the processor to perform operations comprising:
  defining a thread flow marker class for a source code, the thread flow marker class configured to identify markers for classes of objects in the source code and determine an order of thread execution from the classes of objects using the markers;
  embedding a plurality of markers of the thread flow marker class in a class of interest or in places of interest within the class of interest in the source code, wherein a first marker of the plurality of markers is embedded at a first position in the source code and a second marker of the plurality of markers is embedded at a second position in the source code; and
  defining a vector for the thread flow marker class;
  determining that a first thread has executed a first portion of the source code corresponding to the first position;
  writing to the vector a first integer value corresponding to the first marker;
  determining that a second thread has executed a second portion of the source code corresponding to the second position;
  writing to the vector a second integer value corresponding to the second marker;
  performing a thread dump and a heap dump of the executed source code;
  identifying a sequence of integer values from the vector in response to the thread dump and heap dump, wherein the sequence of integer values comprises the first integer value and the second integer value; and
  determining an order of execution of a plurality of concurrent threads from the executed source code based at least in part on the sequence of integer values from the vector, wherein the plurality of concurrent threads comprises at least the first thread and the second thread; and
  tracking, using a hardware processor of a machine, a flow of data from the plurality of concurrent threads based at least in part on the order of execution of the plurality of concurrent threads.

10. The non-transitory machine readable medium of claim 9, further comprising:
  using the sequence of integer values from the vector to identify a time sequence of execution of the first thread and the second thread, wherein the first thread and the second thread are deadlocked; and
  identifying objects causing deadlock of the first thread and the second thread using the time sequence.

11. The non-transitory machine readable medium of claim 9, further comprising:
  using the sequence of integer values from the vector to identify a time sequence of the execution of objects that are causing a memory leak; and
  identifying Objects causing the memory leak using the time sequence.

12. The non-transitory machine readable medium of claim 9, further comprising:
  using the sequence of integer values from the vector to identify at least one thread causing a deadlock.

* * * * *